United States Patent
Uemura

(10) Patent No.: US 11,833,867 B2
(45) Date of Patent: Dec. 5, 2023

(54) TIRE

(71) Applicant: BRIDGESTONE CORPORATION, Tokyo (JP)

(72) Inventor: Kazuki Uemura, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 234 days.

(21) Appl. No.: 17/285,149

(22) PCT Filed: Oct. 16, 2019

(86) PCT No.: PCT/JP2019/040760
§ 371 (c)(1),
(2) Date: Apr. 14, 2021

(87) PCT Pub. No.: WO2020/080439
PCT Pub. Date: Apr. 23, 2020

(65) Prior Publication Data
US 2021/0362549 A1 Nov. 25, 2021

(30) Foreign Application Priority Data
Oct. 17, 2018 (JP) ................................. 2018-196204

(51) Int. Cl.
*B60C 9/18* (2006.01)
*B60C 9/20* (2006.01)
*B60C 9/22* (2006.01)

(52) U.S. Cl.
CPC .............. *B60C 9/2006* (2013.01); *B60C 9/20* (2013.01); *B60C 2009/2067* (2013.01);
(Continued)

(58) Field of Classification Search
CPC ... B60C 9/0057; B60C 9/22; B60C 2009/229; B60C 2009/2223; B60C 2009/2295; B60C 2009/2074
See application file for complete search history.

(56) References Cited

U.S. PATENT DOCUMENTS 5,383,507 A   1/1995   Sato et al.
5,524,687 A   6/1996   Poquéet al.
(Continued)

FOREIGN PATENT DOCUMENTS

CN   101443203 A   5/2009
CN   101583501 A   11/2009
(Continued)

OTHER PUBLICATIONS

Machine translation of JP 3-176205, 1991.*
(Continued)

*Primary Examiner* — Justin R Fischer
(74) *Attorney, Agent, or Firm* — Sughrue Mion, PLLC

(57) ABSTRACT

The present invention provides a tire that uses an elastomer-metal cord composite, which composite is obtained by coating metal cords with an elastomer, each metal cord being composed of a bundle of metal filaments arranged without being twisted, and which composite is capable of highly improving the performance of the tire. The above described tire is one including a belt (105) which includes at least two belt layers (105a) and (105b). In this tire, the belt layers (105a) and (105b) are each obtained by coating metal cords (2) with an elastomer (3), each metal cord (2) being composed of a bundle of a plurality of metal filaments (1) arranged in a row without being twisted; at least one pair of adjacent metal filaments in the metal cord (2) differ in at least one of the amount of shaping and shaping pitch; each of the belt layers (105a) and (105b) has a thickness t1 of more than 0.30 mm and less than 1.00 mm; and the distance g in the tire radial direction between the metal cords (2) in the two adjacent belt layers (105a) and (105b) is 0.10 mm or more and 1.20 mm or less at the center of the tire.

16 Claims, 3 Drawing Sheets

(52) U.S. Cl.
 CPC .................. *B60C 2009/2074* (2013.01);
           *B60C 2009/229* (2013.01); *B60C 2009/2295*
                                              (2013.01)

(56) References Cited

U.S. PATENT DOCUMENTS

| | | | |
|---|---|---|---|
| 5,603,786 | A | 2/1997 | Tozawa et al. |
| 5,795,416 | A | 8/1998 | Willard, Jr. et al. |
| 5,908,520 | A | 6/1999 | Kodama |
| 6,354,068 | B1 | 3/2002 | Onuma et al. |
| 6,568,445 | B1 | 5/2003 | Kojima |
| 2001/0018942 | A1* | 9/2001 | Miyazaki ............ B60C 9/2009 152/526 |
| 2002/0185205 | A1 | 12/2002 | Miyazaki et al. |
| 2009/0188600 | A1 | 7/2009 | Kitahara |
| 2010/0154956 | A1 | 6/2010 | Krier et al. |
| 2010/0294413 | A1 | 11/2010 | Johnson et al. |
| 2012/0000590 | A1 | 1/2012 | Cogne et al. |
| 2013/0263994 | A1 | 10/2013 | Nakamura |
| 2014/0000779 | A1 | 1/2014 | Naoi et al. |
| 2015/0000813 | A1 | 1/2015 | Yoshimi |
| 2015/0239301 | A1 | 8/2015 | Vallet et al. |
| 2016/0339746 | A1 | 11/2016 | Sato et al. |
| 2017/0050468 | A1 | 2/2017 | Delfino |
| 2018/0370282 | A1 | 12/2018 | Tarutani |
| 2019/0184750 | A1 | 6/2019 | Sasaki |
| 2019/0248184 | A1 | 8/2019 | Guillaumain et al. |
| 2020/0039294 | A1 | 2/2020 | Uemura |
| 2020/0039295 | A1 | 2/2020 | Uemura |

FOREIGN PATENT DOCUMENTS

| | | | |
|---|---|---|---|
| CN | 102256808 | A | 11/2011 |
| CN | 103442908 | A | 12/2013 |
| CN | 104245357 | A | 12/2014 |
| CN | 105849325 | A | 8/2016 |
| CN | 108367595 | A | 8/2018 |
| EP | 0511797 | A | 11/1992 |
| EP | 0 573 237 | A1 | 12/1993 |
| EP | 0 588 780 | A1 | 3/1994 |
| EP | 1063346 | A2 | 12/2000 |
| EP | 1284203 | A1 | 2/2003 |
| EP | 1900549 | * | 3/2008 |
| EP | 1900549 | A1 | 3/2008 |
| EP | 2200846 | A1 | 6/2010 |
| EP | 2682279 | A1 | 1/2014 |
| EP | 3 127 939 | A1 | 2/2017 |
| JP | 3-176205 | * | 7/1991 |
| JP | 4-328003 | A | 11/1992 |
| JP | 05-338406 | A | 12/1993 |
| JP | 06-235179 | A | 8/1994 |
| JP | 07-145578 | A | 6/1995 |
| JP | 07-157986 | A | 6/1995 |
| JP | 09-013288 | A | 1/1997 |
| JP | 11-021776 | A | 1/1999 |
| JP | 2000-079806 | A | 3/2000 |
| JP | 2000-185512 | A | 7/2000 |
| JP | 2000-198311 | A | 7/2000 |
| JP | 2001-080316 | A | 3/2001 |
| JP | 2001-334810 | A | 12/2001 |
| JP | 2002-103913 | A | 4/2002 |
| JP | 2002-339276 | A | 11/2002 |
| JP | 2003-226111 | A | 8/2003 |
| JP | 2004-306725 | A | 11/2004 |
| JP | 2006-160121 | A | 6/2006 |
| JP | 2008-279896 | A | 11/2008 |
| JP | 2011-020644 | A | 2/2011 |
| JP | 2011-025795 | A | 2/2011 |
| JP | 2012-106570 | A | 6/2012 |
| JP | 2012-148644 | A | 8/2012 |
| JP | 2013-220755 | A | 10/2013 |
| JP | 2014-088120 | A | 5/2014 |
| JP | 2014-121923 | A | 7/2014 |
| JP | 2014-213723 | A | 11/2014 |
| JP | 2017-141002 | A | 8/2017 |
| JP | 2017-141005 | A | 8/2017 |
| JP | 2017-190554 | A | 10/2017 |
| JP | 2018-108759 | A | 7/2018 |
| JP | 2018-176960 | A | 11/2018 |
| KR | 95-18885 | A | 7/1995 |
| WO | 2009/033977 | A1 | 3/2009 |
| WO | 2015/151410 | A1 | 10/2015 |
| WO | 2015/165777 | A1 | 11/2015 |
| WO | 2018/038050 | A1 | 3/2018 |
| WO | 2018/051032 | A1 | 3/2018 |
| WO | 2018/190308 | A1 | 10/2018 |
| WO | 2018/190309 | A1 | 10/2018 |

OTHER PUBLICATIONS

International Search Report of PCT/JP2019/040760 dated Jan. 14, 2020 [PCT/ISA/210].
Extended European Search Report dated Jun. 15, 2022 from the European Patent Office in EP Application No. 19872534.3.
Search Report dated Jun. 7, 2022 from the China National Intellectual Property Administration in CN Application No. 201980068408.3.
Anonymous, "Frequency Dependence of Glass Transition Temperatures", TA423, TA Instruments Technical Library, Mar. 29, 2023 (2 pages).
Chinese Search Report dated Jul. 5, 2022 in Chinese Application No. 201980068495.2.
Chinese Search Report dated Jun. 23, 2022 in Chinese Application No. 201980068489.7.
Extended European Search Report dated Apr. 12, 2023 from the European Patent Office in EP Application No. 19873740.5.
Office Action dated Feb. 8, 2023 in U.S. Appl. No. 17/284,900.
Extended European Search Report dated Jun. 15, 2022 in European Application No. 19873738.9.
International Search Report of PCT/JP2019/040764 dated Jan. 14, 2020.
International Search Report of PCT/JP2019/040768 dated Jan. 7, 2019 [PCT/ISA/210].
Office Action dated Feb. 8, 2023 in U.S. Appl. No. 17/285,142.
Office Action dated Apr. 26, 2023 in U.S. Appl. No. 17/285,142.

* cited by examiner

TIRE

CROSS REFERENCE TO RELATED APPLICATIONS

This application is a National Stage of International Application No. PCT/JP2019/040760 filed on Oct. 16, 2019, claiming priority based on Japanese Patent Application No. 2018-196204 filed on Oct. 17, 2018.

TECHNICAL FIELD

The present invention relates to a tire, and more particularly relates to a tire in which an elastomer-metal cord composite is used for a belt, which composite is obtained by coating metal cords with an elastomer, each metal cord being composed of a bundle of metal filaments arranged without being twisted.

BACKGROUND ART

A tire, for which strength is required, generally includes, in the interior thereof: a carcass embedded along the meridian direction of a ring-like tire body, and including a reinforcing cord; and a belt layer disposed on the outer side in the tire radial direction of the carcass. Such a belt layer is usually formed using an elastomer-metal cord composite obtained by coating metal cords, such as steel cords, with an elastomer, so as to impart load bearing capacity, traction resistance and the like to the tire.

In recent years, there are increasing demands for reducing the weight of tires, in order to improve the fuel efficiency of automobiles. As means for reducing the weight of tires, metal cords for belt reinforcement are drawing attention and a number of techniques are disclosed, in which metal filaments are used as belt cords, without being twisted. For example, Patent Document 1 proposes a tire in which metal filaments having a small diameter are arranged in parallel at a high tensile strength, without being twisted, to form metal filament bundles, and at least two belt plies, in each of which the thus formed filament bundles are arranged in the width direction in a coating rubber, are used to form belt layers, in an attempt to improve lightness and durability. In this tire, the number of metal filaments in each metal filament bundle is optimized depending on the diameter of the metal filaments. Further, it is also proposed therein that the thickness of each metal filament bundle in the radial direction with respect to the thickness of each belt ply is adjusted to a specific ratio.

RELATED ART DOCUMENT

Patent Document

Patent Document 1: JP 2001-334810 A

SUMMARY OF THE INVENTION

Problems to be Solved by the Invention

However, although Patent Document 1 examines the lightness and durability of the tire, examinations on other performances have not been done. Therefore, with increasingly higher performances of tires, in the future, it is expected that a further improvement is needed, in the case of using metal filaments as belt cords without twisting.

Accordingly, an object of the present invention is to provide a tire in which an elastomer-metal cord composite is used for a belt, which composite is obtained by coating metal cords with an elastomer, each metal cord being composed of a bundle of metal filaments arranged without being twisted, and which composite is capable of highly improving the performance of the tire.

Means for Solving the Problems

As a result of intensive studies to solve the above-mentioned problems, the present inventors have obtained the following findings. That is, when metal cords in which metal filaments are bundled without being twisted are used, the metal cords reduce the in-plane deformation upon compression input to a belt treat, leading to a worsened fatigue of the metal cords. Further, in the metal cords in which metal filaments are bundled without being twisted, rubber is difficult to infiltrate into gaps between adjacent metal filaments, and thus causes the occurrence of non-rubber-coated regions, which are not coated by the rubber. Accordingly, the positions of the metal filaments may be shifted relative to one another, when the tire rolls, to cause a decrease in in-plane rigidity (rigidity within the tire tread), possibly resulting in impaired steering stability. Based on such findings, the present inventors have found out, as a result of further intensive studies, that it is possible to solve the above mentioned problems by configuring bundles of metal filaments as follows, thereby completing the present invention.

Specifically, the tire according to the present invention is a tire including:
  a carcass as a skeleton extending toroidally between a pair of bead portions; and
  a belt disposed on the outer side in the tire radial direction of a crown portion of the carcass and including at least two belt layers;
characterized in that:
  the belt layers are each composed of an elastomer-metal cord composite obtained by coating metal cords with an elastomer, each metal cord being composed of a bundle of a plurality of metal filaments arranged in a row without being twisted;
  at least one pair of adjacent metal filaments in the metal cord differ in at least one of the amount of shaping and shaping pitch;
  each of the belt layers has a thickness of more than 0.30 mm and less than 1.00 mm; and
  the distance in the tire radial direction between the metal cords in two adjacent layers of the belt layers is 0.10 mm or more and 1.20 mm or less at the center of the tire.

FIG. 1 is an explanatory diagram of a metal filament illustrating definitions of an amount of shaping h and a shaping pitch p of the metal filament. The amount of shaping h as used herein refers to the width of variation of the metal filament 1 which does not include the wire diameter of the filament. The amount of shaping h of the metal filament 1 is determined by projecting an image of the metal filament 1 after being shaped, by a projector, and measuring the image of the metal filament projected on a screen or the like.

In the tire according to the present invention, the metal filaments that are shaped preferably have the same amount of shaping and the same pitch. Further, in the tire according to the present invention, the elastomer coverage of the adjacent metal filaments on the side surfaces in the width direction of the metal cord is preferably 10% or more per unit length. Still further, in the tire according to the present invention, at least one of the metal filaments in the metal cord is preferably a substantially straight metal filament. Yet still further, in the tire according to the present invention, the straight metal filaments and the metal filaments that are shaped are preferably arranged alternately. Yet still further, in the tire according to the present invention, the metal filaments arranged at both ends of the metal cord are preferably the straight metal filaments. Yet still further, in the tire according to the present invention, the metal filaments that are shaped may be two-dimensionally shaped, or three-dimensionally shaped. When the metal filaments are two-dimensionally shaped, each of the metal filaments preferably has an amount of shaping from 0.03 to 0.30 mm, and a shaping pitch of from 2 to 30 mm, and further, the shaping direction of the metal filaments that are shaped is preferably the width direction of the metal cord. Yet still further, in the tire according to the present invention, an interlayer rubber is preferably provided between the belt layers that are adjacent to each other, at each end thereof in the tire width direction, and in this case, the interlayer rubber preferably has a thickness of 0.2 mm or more and 1.2 mm or less. Yet still further, in the tire according to the present invention, the elastomer preferably has a 50% modulus value, as measured in accordance with JIS K6251 (2010), of 1.5 MPa or more. Yet still further, in the tire according to the present invention, each of the metal filaments preferably has a tensile strength of 2,500 MPa or more. In the tire according to the present invention, a straight metal filament refers to a metal filament that has not been intentionally subjected to shaping and is substantially not shaped.

The elastomer coverage as used herein refers to a value determined as follows. For example, in cases where rubber is used as the elastomer, and steel cords are used as the metal cords, the steel cords are coated with the rubber, subjected to vulcanization, and then each steel cord is pulled out from the resulting rubber-steel cord composite. Thereafter, the lengths of the regions of the steel filaments, on the side surfaces in the width direction of the metal cord, which have been coated by the rubber infiltrated into gaps between the steel filaments constituting the steel cord, are measured, and the average of the values calculated based on the following calculation formula, is determined as the elastomer coverage.

Elastomer coverage=(rubber coated length/sample length)×100(%)

The elastomer coverage can be calculated in the same manner, in cases where an elastomer other than rubber is used as the elastomer, and also in cases where metal cords other than steel cords are used as the metal cords.

Effects of the Invention

According to the present invention, it is possible to provide a tire in which an elastomer-metal cord composite is used for a belt, which composite is obtained by coating metal cords with an elastomer, each metal cord being composed of a bundle of metal filaments arranged without being twisted, and which composite is capable of highly improving the performance of the tire.

MODE FOR CARRYING OUT THE INVENTION

The tire according to the present invention will now be described in detail.

Figure 1:
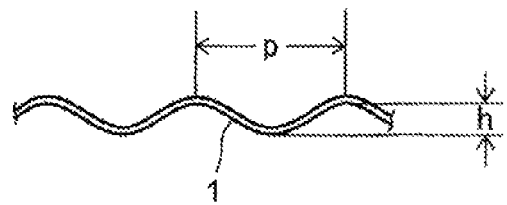
FIG. 1 is an explanatory diagram of a metal filament illustrating definitions of an amount of shaping h and a shaping pitch p of the metal filament.
Figure 2:
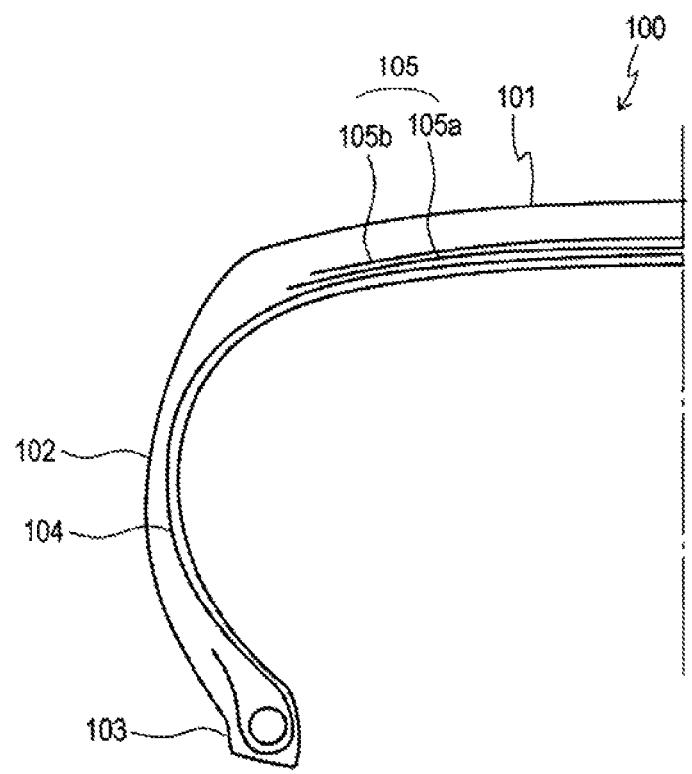
FIG. 2 is a schematic half cross-sectional view of a tire according to one suitable embodiment of the present invention.

FIG. 2 shows a schematic half cross-sectional view of a tire according to one suitable embodiment of the present invention. A tire 100 shown in FIG. 2 includes: a tread portion 101 which forms a grounding surface; a pair of side wall portions 102 extending inward in the tire radial direction, continuously from both sides of the tread portion 101; and bead portions 103 each provided continuously at the inner peripheral side of each side wall portion 102.

In the tire 100 shown in FIG. 2, the tread portion 101, the side wall portions 102 and the bead portions 103 are reinforced by a carcass 104 composed of one piece of a carcass layer extending toroidally from one bead portion 103 to the other bead portion 103. Further, the tread portion 101 is reinforced by a belt 105 which is disposed on the outer side in the tire radial direction of the crown region of the carcass 104, and which includes at least two layers, which are a first belt layer 105a and a second belt layer 105b in the example shown in FIG. 2. The carcass 104 may include a plurality of carcass layers, and organic fiber cords extending in a direction substantially orthogonal to the tire circumferential direction, for example, extending at an angle of from 70 to 90°, can be suitably used.

In the tire 100 according to the present invention, the at least two belt layers are each composed of an elastomer-metal cord composite obtained by coating metal cords with an elastomer, each metal cord being composed of a bundle of a plurality of metal filaments arranged in a row without being twisted. In the tire 100 according to the present invention, at least one pair of adjacent metal filaments in the metal cord included in the elastomer-metal cord composite differ in at least one of the amount of shaping and shaping pitch; each of the belt layers has a thickness of more than 0.30 mm and less than 1.00 mm; and the distance in the tire radial direction between the metal cords in two adjacent layers of the belt layers is 0.10 mm or more and 1.20 mm or less at the center of the tire. By employing such a structure, it is possible to ensure the durability while reducing the thickness of the belt 105, and to achieve a reduction in the weight of the tire. Further, the in-plane rigidity of the belt is improved, as a result of which the steering stability of the tire can be favorably ensured. In other words, the durability of the belt and the steering stability can be improved simultaneously. The elastomer-metal cord composite according to the tire 100 of the present invention will now be described in detail.

Figure 3:
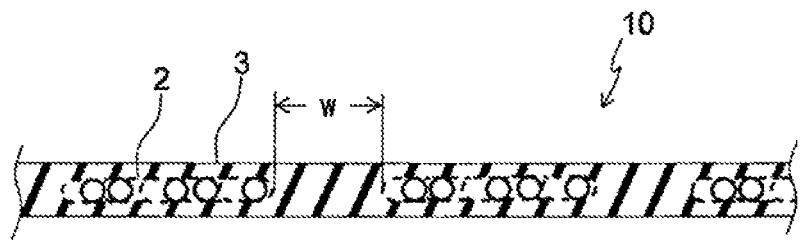
FIG. 3 is a partial cross-sectional view in the width direction of an elastomer-metal cord composite used for a belt layer of the tire according to one suitable embodiment of the present invention.
Figure 4:
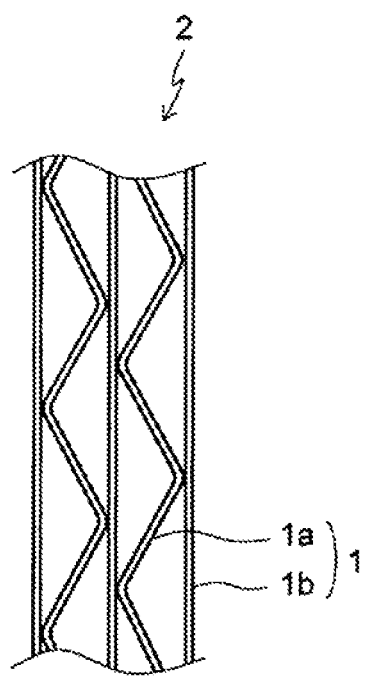
FIG. 4 is a schematic plan view of a metal cord in the elastomer-metal cord composite used for the belt layer of the tire according to one suitable embodiment of the present invention.
Figure 5:
FIG. 5 is a schematic cross-sectional view in the width direction of the metal cord in the elastomer-metal cord composite used for the belt layer of the tire according to one suitable embodiment of the present invention.
Figure 6:
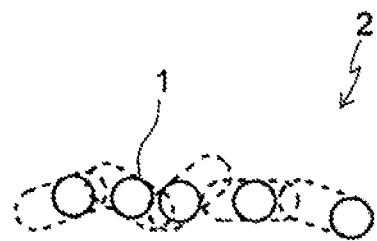
FIG. 6 is another example of a schematic cross-sectional view in the width direction of the metal cord in the elastomer-metal cord composite used for the belt layer of the tire according to one suitable embodiment of the present invention.

FIG. 3 is a partial cross-sectional view in the width direction of an elastomer-metal cord composite used for a belt layer of the tire according to one suitable embodiment of the present invention; FIG. 4 is a schematic plan view of a metal cord in the elastomer-metal cord composite used for the belt layer of the tire according to one suitable embodiment of the present invention; FIG. 5 is a schematic cross-sectional view in the width direction of the metal cord in the elastomer-metal cord composite used for the belt layer of the tire according to one suitable embodiment of the present invention; and FIG. 6 is another example of a schematic cross-sectional view in the width direction of the metal cord in the elastomer-metal cord composite used for the belt layer of the tire according to one suitable embodiment of the present invention.

An elastomer-metal cord composite 10 according to the tire 100 of the present invention is one obtained by coating metal cords 2 with an elastomer 3, each metal cord 2 being composed of a bundle of a plurality of metal filaments 1 arranged in a row without being twisted. Each metal cord 2 is composed of a bundle of suitably two or more pieces, more suitably 5 or more pieces, and at the same time, suitably 20 or less pieces, more suitably 12 or less pieces, still more suitably 10 or less pieces, and particularly suitably 9 or less pieces, of the metal filaments 1. In the examples shown in the figures, 5 pieces of the metal filaments 1 are arranged without being twisted to form each metal cord 2.

In the metal cord 2 included in the elastomer-metal cord composite 10 according to the tire 100 of the present invention, at least one pair of adjacent metal filaments differ from each other in at least one of the amount of shaping and the shaping pitch. Preferably, 50% or more of the pairs of adjacent metal filaments 1 differ in at least one of the amount of shaping and the shaping pitch. In the tire 100 according to the present invention, at least one of the metal filaments 1 in the metal cord 2 is preferably a substantially straight metal filament. In the example shown in FIG. 4, shaped metal filaments 1a and non-shaped filaments 1b (amount of shaping: 0 mm, shaping pitch: ∞ mm) are arranged alternately. However, metal filaments having different amounts of shaping may be arranged alternately, or metal filaments having different shaping pitches may be arranged alternately. Suitably, the metal filaments constituting each bundle are arranged such that straight metal filaments which are not shaped are disposed at both sides of the bundle. As described above, in the elastomer-metal cord composite 10 according to the tire 100 of the present invention, the metal filaments 1 differing in the amount of shaping or the shaping pitch are arranged adjacently so as to avoid the situation where the phases of the adjacent filaments coincide. Such a configuration enables the elastomer to sufficiently infiltrate into gaps between the adjacent metal filaments 1. As a result, the metal cords are allowed to deform out-of-plane and the breakability of the metal cords can be reduced, upon compression input.

Further, as described above, the elastomer is difficult to infiltrate into gaps between adjacent filaments, in the bundles of metal filaments 1, and thus causes the occurrence of non-elastomer-coated regions, which are not coated by the elastomer. Therefore, when the metal cords in which metal filaments are bundled without being twisted are used as the belt cords, the positions of the metal filaments may be shifted relative to one another in such non-elastomer-coated regions, when the tire rolls. As a result, there are cases where the in-plane rigidity of the belt is decreased, resulting in an impaired steering stability. In the elastomer-metal cord composite 10 according to the tire 100 of the present invention, however, the elastomer 3 can sufficiently infiltrate into gaps between adjacent metal filaments 1, thereby making it possible to solve the above mentioned shortcomings, to improve the in-plane rigidity of the belt 105, and to improve the steering stability.

In the elastomer-metal cord composite 10 according to the tire 100 of the present invention, it is preferred that the metal filaments that are shaped have the same amount of shaping and the same pitch. Further, the metal filaments 1 may be subjected to two-dimensional shaping, such as zig-zag shaping or waveform shaping, as shown in the figures, or may be subjected to helical three-dimensional shaping. However, it is preferred that the metal filaments 1 do not overlap with one another in the thickness direction of the metal cord 2.

In order to obtain the effects of eliminating the continuous presence of the non-elastomer-coated regions between adjacent metal filaments to ensure corrosion propagation resistance, and of improving the in-plane rigidity of the belt to improve steering stability, in the elastomer-metal cord composite 10 according to the tire 100 of the present invention, the elastomer coverage of the adjacent metal filaments 1 on the side surfaces in the width direction of the metal cord 2 is preferably 10% or more, and more preferably 20% or more, per unit length. The elastomer coverage is more preferably 50% or more, and particularly preferably 80% or more. The elastomer coverage is most preferably 90% or more.

In the elastomer-metal cord composite 10 according to the tire 100 of the present invention, when the amount of shaping of the metal filaments 1 is too large, the distance w between two adjacent metal cords 2 in the elastomer-metal cord composite 10 is reduced, causing a decrease in the strength of the belt. Therefore, the amount of shaping of each metal filament 1, in the case of two-dimensional shaping, is preferably 0.03 mm or more and 0.30 mm or less. When the amount of shaping is adjusted to 0.30 mm or less, the strength of the belt layers 105a and 105b can be ensured, and the effects of the present invention can be sufficiently obtained. Particularly from the viewpoints of the distance w between two adjacent metal cords 2 and the strength of the metal filaments 1, the amount of shaping of each metal filament 1, in the case of performing two-dimensional shaping thereon, is preferably 0.03 mm or more and 0.30 mm or less, more preferably 0.03 mm or more and 0.25 mm or less, and most preferably 0.03 mm or more and 0.20 mm or less. From the same reason, the shaping pitch of each metal filament 1, in the case of two-dimensional shaping, is preferably 2 mm or more and 30 mm or less, more preferably 2 mm or more and 20 mm or less, and most preferably 3 mm or more and 15 mm or less. When the shaping pitch of each metal filament 1 is adjusted to 2 mm or more, it is possible to reduce a decrease in the strength of the filaments or an increase in the weight of the metal cords.

Figure 7:
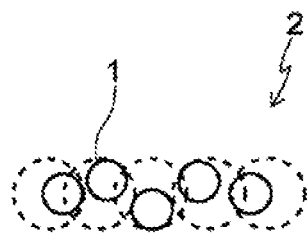
FIG. 7 is a schematic cross-sectional view in the width direction of a metal cord in an elastomer-metal cord composite used for a belt layer of a tire according to another suitable embodiment of the present invention.

FIG. 7 shows a schematic cross-sectional view in the width direction of a metal cord in an elastomer-metal cord composite used for a belt layer of a tire according to another suitable embodiment of the present invention. When the metal filaments 1 are three-dimensionally shaped, as shown in FIG. 7, the amount of shaping of each metal filament 1 is preferably 0.10 mm or more and 0.50 mm or less, and more preferably from 0.20 mm or more and 0.30 mm or less. When the amount of shaping is adjusted to 0.50 mm or less, a decrease in the strength of the belt layers 105a and 105b can be reduced, to sufficiently obtain the effects of the present invention. In the case of three-dimensional shaping, the shaping pitch of each metal filament 1 is preferably 5 mm or more, and more preferably 8 mm or more and 20 mm or less.

In the metal cord 2 shown in FIG. 4, the shaped metal filaments 1a are shaped in the width direction of the metal cord 2. In the elastomer-metal cord composite 10 according to the present invention, however, the shaping direction of the metal filaments 1 may be inclined with respect to the width direction the metal cord 2, as shown in FIG. 6. Even with such a structure, it is also possible to allow rubber to sufficiently infiltrate into gaps between the adjacent metal filaments 1, and to obtain the effects of the present invention. However, in the belt layers 105a and 105b according to the tire 100 of the present invention, it is preferred that the shaping direction of the adjacent metal filaments 1 be the width direction of the metal cord 2 from the viewpoint of lightness, because the thickness of the belt 105 can be reduced.

In the belt layers 105a and 105b of the tire 100 according to the present invention, at least one of the metal filaments 1 in the metal cord 2 is preferably a substantially straight metal filament. In cases where the straight metal filaments 1b that are not shaped and the shaped metal filaments 1a are arranged adjacently, as shown in FIG. 4, the amount of the elastomer infiltrated into gaps between both types of the metal filaments 1 is increased, which causes an increase in the elastomer coverage of the adjacent metal filaments 1 on the side surfaces in the width direction of the metal cord 2. As a result, the effects of the present invention can be favorably obtained. Further, the use of the straight metal filaments as the metal filaments 1 disposed at both ends of the metal cord 2 enables to increase the distance w between two adjacent metal cords 2 in the elastomer, making it possible to improve the durability. More preferably, the straight metal filaments 1b that are not shaped and the shaped metal filaments 1a are arranged alternately, as shown in FIG. 4.

Figure 8:
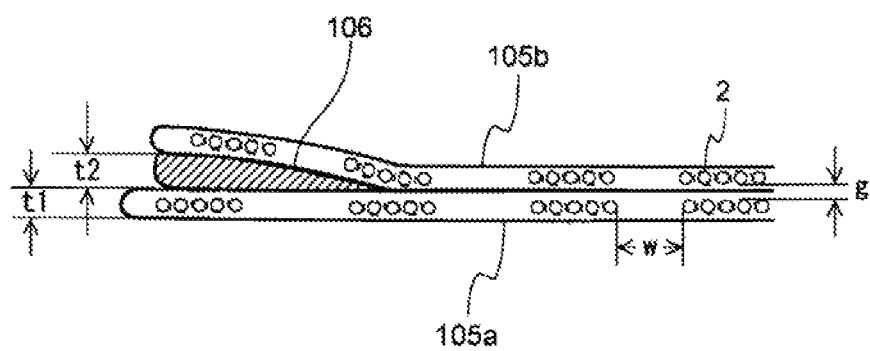
FIG. 8 is a schematic half cross-sectional view of a belt in the tire according to one suitable embodiment of the present invention.

FIG. 8 shows a schematic half cross-sectional view of the belt in the tire according to one suitable embodiment of the present invention. In the tire 100 according to the present invention, each of the belt layers 105a and 105b has a thickness t1 of more than 0.30 mm and less than 1.00 mm, and suitably 0.40 mm or more and 0.90 mm or less, from the viewpoint of lightness. Further, the distance g in the tire radial direction between the metal cords 2 in the two adjacent belt layers 105a and 105b is 0.1 mm or more and 1.20 mm or less at the center of the tire. When the distance g is adjusted within such a range, it is possible to reduce the weight of the belt, to prevent the occurrence of cracks in the rubber between adjacent belt layers, and to improve the durability. The distance g is suitably 0.1 mm or more and 0.8 mm or less.

In the tire 100 according to the present invention, an interlayer rubber 106 for ensuring the interlayer distance is preferably provided between the adjacent belt layers, at each end thereof in the tire width direction. In this case, the interlayer rubber 106 preferably has a thickness t2 of 0.2 mm or more and 1.2 mm or less. When the thickness t2 of the interlayer rubber 106 is adjusted to 0.2 mm or more, a sufficient interlayer distance between the belt layers can be ensured, and the occurrence of separation at the belt ends can be reduced. When the thickness t2 of the interlayer rubber 106 is 1.2 mm or less, on the other hand, it causes no problem in achieving a reduction the weight of the tire. In the tire 100 according to the present invention, the interlayer rubber 6 may have a sheet-like shape, as shown in FIG. 8, or may have a shape that covers one end of the belt layers. When the interlayer rubber 6 has the shape that covers one end of the belt layers, the interlayer rubber may be provided so as to cover each end of all the belt layers, or to cover each end of only a part of the belt layers, for example, only the first belt layer or only the second belt layer.

In the tire 100 according to the present invention, the coating rubber coating the metal cords 2 can be used as the interlayer rubber 106; however, a different material may be used.

In the tire 100 according to the present invention, the elastomer coating the metal cords 2 in the belt layers preferably has a 50% modulus value, as measured in accordance with JIS K6251 (2010), of 1.5 MPa or more. The elastomer preferably has a 50% modulus value of 1.8 MPa or more, and more preferably 2.0M Pa or more. When such an elastomer is used for coating the belt layers 105a and 105b, it is possible to inhibit the elongation of the metal cords 2 in the longitudinal direction, and to further improve the rigidity of the belt 105, even in cases where the metal cords 2 are elongated in the longitudinal direction and tightened by twisting, since the elastomer present in the interior of the metal cords 2 has a high rigidity. As a result, the steering stability can further be improved.

Examples of such an elastomer include, in the case of rubbers, for example, in addition to conventional rubbers; diene-based rubbers and hydrogenation products thereof, such as natural rubber (NR), isoprene rubber (IR), epoxidized natural rubber, styrene-butadiene rubber (SBR), butadiene rubber (BR, high-cis BR and low-cis BR), nitrile rubber (NBR), hydrogenated NBR and hydrogenated SBR; olefin-based rubbers such as ethylene propylene rubber (EPDM, EPM), maleic acid-modified ethylene propylene rubber (M-EPM), butyl rubber (IIR), copolymers of isobutylene and an aromatic vinyl or diene monomer, acrylic rubber (ACM) and ionomers; halogen-containing rubbers such as Br-IIR, CI-IIR, brominated isobutylene paramethylstyrene copolymers (Br-IPMS), chloroprene rubber (CR), hydrin rubber (CHR), chlorosulfonated polyethylene rubber (CSM), chlorinated polyethylene rubber (CM) and maleic acid-modified chlorinated polyethylene rubber (M-CM); silicone rubbers such as methyl vinyl silicone rubber, dimethyl silicone rubber and methyl phenyl vinyl silicone rubber; sulfur rubbers such as polysulfide rubber; fluororubbers such as vinylidene fluoride-based rubbers, fluorine-containing vinyl ether-based rubbers, tetrafluoroethylene-propylene-based rubbers, fluorine-containing silicon-based rubbers and fluorine-containing phosphazene-based rubbers; thermoplastic elastomers such as styrene-based elastomers, olefin-based elastomers, ester-based elastomers, urethane-based elastomers and polyamide-based elastomers. The 50% modulus value of the coating rubber is a value obtained by vulcanizing a rubber composition of each sample at 145° C. for 40 minutes to obtain a vulcanized rubber, and then performing the measurement in accordance with JIS K 6251 (2010).

In the belt layers 105a and 105b of the tire 100 according to the present invention, the metal filaments 1 usually refer to linear-shaped pieces made of steel, namely, made of a metal containing iron as a main component (the mass of iron with respect to the total mass of the metal filament is more than 50% by mass), and may consist of iron, or may contain a metal(s) other than iron, such as zinc, copper, aluminum, tin and/or the like.

Further, in the belt layers 105a and 105b of the tire 100 according to the present invention, the surface condition of the metal filaments 1 is not particularly limited, and the metal filaments 1 may be, for example, in any of the following forms. Specifically, each metal filament 1 may be, for example, in a form in which N atoms on the surface thereof is 2 atomic % or more and 60 atomic % or less, and the Cu/Zn ratio on the surface thereof is 1 or more and 4 or less. Further, each metal filament 1 may be, for example, in a form in which the amount of phosphorus contained as oxides in the outermost layer of the metal filament, which is the region of the metal filament from the filament surface to 5 nm inward in the filament radial direction, is 7.0 atomic % or less, as the ratio with respect to the total amount excluding the amount of C.

In the belt layers 105a and 105b of the tire 100 according to the present invention, the surface metal filaments 1 may be plated. The type of plating is not particularly limited, and examples thereof include: zinc (Zn) plating, copper (Cu) plating, tin (Sn) plating, brass (copper-zinc (Cu—Zn)) plating and bronze (copper-tin (Cu—Sn)) plating; and ternary plating, such as copper-zinc-tin (Cu—Zn—Sn) plating and copper-zin-cobalt (Cu—Zn—Co) plating. Among these, brass plating or copper-zinc-cobalt plating is preferred. This is because metal filaments having brass plating have an excellent adhesion to rubber. The brass plating usually contains copper and zinc at a ratio (copper:zinc) in mass basis of from 60 to 70:30 to 40, and the copper-zinc-cobalt plating usually contains from 60 to 75% by weight of copper and 0.5 to 10% by weight of cobalt. In general, a plating layer has a thickness of 100 nm or more and 300 nm or less.

Further, in the belt layers 105a and 105b of the tire 100 according to the present invention, the wire diameter, the tensile strength, and the cross-sectional shape of each metal filament 1 are not particularly limited. For example, the wire diameter of each metal filament 1 may be 0.15 mm or more and 0.40 mm or less. Further, one having a tensile strength of 2,500 MPa (250 kg/mm$^2$) or more can be used as the metal filament 1. The cross-sectional shape in the width direction of the metal filament 1 is also not particularly limited, may be an elliptical shape, a rectangular shape, a triangular shape, a polygonal shape or the like. However, a circular shape is preferred. In cases where it is necessary to bind a bundle of the metal filaments 1 constituting each metal cord 2, in the elastomer-metal cord composite 10 according to the present invention, a wrapping filament (a spiral filament) may be used.

The elastomer-metal cord composite according to the tire of the present invention can be produced by a known method. For example, the elastomer-metal cord composite can be produced by: arranging steel cords as the metal cords, each composed of a bundle of a plurality of metal filaments arranged without being twisted, in parallel and at predetermined intervals; and coating the thus arranged cords with rubber. Thereafter, the resultant can be subjected to vulcanization under general conditions, to produce a sample for evaluation. The shaping of the metal filaments can be performed using a common shaping apparatus in accordance with a conventional method.

The tire 100 according to the present invention is required to have the above-described structure of the belt, and specific tire structures other than that are not particularly limited. For example, a belt reinforcing layer may be disposed on the outer side in the tire radial direction of the belt 105, or another reinforcing member may be used. As the air to be filled into the tire 100, it is possible to use normal air or air whose oxygen partial pressure is adjusted, or an inert gas such as nitrogen, argon or helium gas. The tire according to the present invention can be suitably used as a tire for a passenger car or a tire for a truck or a bus.

EXAMPLES

The present invention will now be described in further detail, with reference to Examples.

Example and Comparative Examples: Preparation of Rubber-Steel Cord Composite

Steel cords of Comparative Examples 1, 2, and Example 1 having the structures shown in Table below, were each prepared using steel filaments A and steel filaments B. The thus prepared steel cords were coated with rubber sheets from both the top and bottom sides and then vulcanized at 160° C. for 10 to 15 minutes to prepare evaluation samples of elastomer-metal cord composites of the respective Example and Comparative Examples. The coating rubber was prepared based on the following composition, by mixing and kneading in accordance with an ordinary method.

Natural rubber: 100 parts by mass

Carbon black*$^1$: 61 parts by mass

Zinc white: 5 parts by mass

Anti-aging agent*$^2$:1 part by mass

Vulcanization accelerator*$^3$: 1 part by mass

Sulfur*$^4$: 5 parts by mass

1 N326, DBP oil absorption: 72 ml/100 g, N$_2$SA: 78 m$^2$/g

2   N-phenyl-N'-1,3-dimethylbutyl-p-phenylenediamine (brand name: NOCRACK 6C, manufactured by Ouchi Shinko Chemical Industrial Co., Ltd.)

3 N,N'-dicyclohexyl-2-benzothiazyl sulfenamide (brand name: NOCCELER DZ, manufactured by Ouchi Shinko Chemical Industrial Co., Ltd.)

4 Insoluble sulfur (brand name: CRYSTEX HS OT-20, manufactured by Flexsys Inc.)

For each of the resulting rubber-steel cord composites, the elastomer coverage, and the steering stability when used as a belt in a tire were evaluated, in accordance with the following procedure.

<Elastomer Coverage>

The elastomer coverage was determined by: coating the steel cords with the rubber and subjecting the resultant to vulcanization; then pulling out the steel cord from the resulting evaluation sample of the rubber-steel cord composite; and measuring the amount of adhered rubber, remaining on the side surfaces in the width direction of the steel cord, of the adjacent steel filaments in the steel cord. The calculation formula of the elastomer coverage is as follows:

$$\text{Elastomer coverage} = (\text{rubber coated length}/\text{sample length}) \times 100(\%).$$

The rubber coated length as used above refers to the length of the region of the steel filament surface which has been completely coated with rubber when the pulled-out steel cord is observed from the direction orthogonal to the longitudinal direction of the cord. A larger value of the elastomer coverage indicates a higher adhesive force and a higher performance.

<Steering Stability>

The evaluation of the in-plane rigidity was carried out, using a crossed belt layer sample prepared using each rubber-steel cord composite, and the evaluation result was used as an index for steering stability. Jigs were disposed at two points at the bottom, and one point on the top of the crossed belt layer sample, and the load when pressed from the one point on the top was defined as the in-plane rigidity and evaluated. The evaluation was performed taking the result of Comparative Example 1, which is Δ, as a standard. The case which is inferior to Comparative Example 1 was evaluated as x, the case with the same result as Comparative Example 1 was evaluated as Δ, the case which is better than Comparative Example 1 was evaluated as ○, and the case which is much better than Comparative Example 1 was evaluated as ⊚.

TABLE 1

| | | | Comparative Example 1 | Comparative Example 2 | Example 1 |
|---|---|---|---|---|---|
| Belt structure | Cord structure | | 1 × 2 (0.3 mm) | 7-piece bundle (0.25 mm) | 7-piece bundle (0.25 mm) Two-dimensional |
| | Steel filaments A | Amount of shaping (mm) | 0 | 0 | 0 |
| | | Shaping pitch (mm) | ∞ | ∞ | ∞ |
| | Steel filaments B | Amount of shaping(mm) | 0 | 0 | 0.15 |
| | | Shaping pitch(mm) | ∞ | ∞ | 4 |
| | Cord count per unit width (pieces/50 mm) | | 38 | 15.6 | 15.6 |
| | Interlayer distance g (mm)*5 | | 0.4 | 0.4 | 0.4 |
| | Inter-cord distance w (mm)*6 | | 0.5 | 1.46 | 0.87 |
| | Belt layer thickness t1 (mm) | | 1 | 0.65 | 0.65 |
| Evaluation Result | Elastomer coverage (%) | | 50 | 0 | 90 |
| | Steering stability | | Δ | X | ⊚ |

*5 the distance in the tire radial direction between the metal cords in two adjacent belt layers
*6 the distance between two adjacent metal cords in the same belt layer It can be seen from Table 1 that it is possible to obtain an elastomer-metal cord composite which is capable of improving the steering stability and the belt durability in a balanced manner, when used as belt cords, and a tire including the same. Further, the elastomer-metal cord composite of Example 1 has a better separation resistance as compared to the elastomer-metal cord composites of Comparative Examples 1 and 2.

DESCRIPTION OF SYMBOLS

1 metal filament
2 metal cord
3 elastomer
10 elastomer-metal cord composite
100 tire
101 tread portion
102 side wall portion
103 bead portion
104 carcass
105 belt
105a,105b belt layer
106 interlayer rubber

The invention claimed is:

1. A tire comprising:
    a carcass as a skeleton extending toroidally between a pair of bead portions; and
    a belt disposed on the outer side in the tire radial direction of a crown portion of the carcass, and including at least two belt layers;
    characterized in that:
    the belt layers are each composed of an elastomer-metal cord composite obtained by coating metal cords with an elastomer, each metal cord being composed of a bundle of a plurality of metal filaments arranged in a row without being twisted;
    at least one pair of adjacent metal filaments in the metal cord differ in at least one of the amount of shaping and shaping pitch;
    each of the belt layers has a thickness of more than 0.30 mm and less than 1.00 mm;
    the distance in the tire radial direction between the metal cords in two adjacent layers of the belt layers is 0.10 mm or more and 1.20 mm or less at the center of the tire; and
    the metal filaments arranged at both ends of each of the metal cords are straight metal filaments.

2. The tire according to claim 1, wherein the metal filaments that are shaped have the same amount of shaping and the same pitch.

3. The tire according to claim 2, wherein the elastomer coverage of the adjacent metal filaments on the side surfaces in the width direction of the metal cord is 10% or more per unit length.

4. The tire according to claim 2, wherein the metal filaments that are shaped are two-dimensionally shaped.

5. The tire according to claim 4, wherein the metal filaments that are shaped have an amount of shaping from 0.03 to 0.30 mm, and a shaping pitch of from 2 to 30 mm.

6. The tire according to claim 1, wherein the elastomer coverage of the adjacent metal filaments on the side surfaces in the width direction of the metal cord is 10% or more per unit length.

7. The tire according to claim 1, wherein the metal filaments that are shaped are two-dimensionally shaped.

8. The tire according to claim 7, wherein the metal filaments that are shaped have an amount of shaping from 0.03 to 0.30 mm, and a shaping pitch of from 2 to 30 mm.

9. The tire according to claim 7, wherein a shaping direction of the metal filaments that are shaped is the width direction of the metal cord.

10. The tire according to claim 1, wherein the metal filaments that are shaped are three-dimensionally shaped.

11. The tire according to claim 1, wherein an interlayer rubber is provided between the belt layers that are adjacent to each other, at each end thereof in the tire width direction.

12. The tire according to claim 11, wherein the interlayer rubber has a thickness of 0.2 mm or more and 1.2 mm or less.

13. The tire according to claim 1, wherein the elastomer has a 50% modulus value, as measured in accordance with JIS K6251 (2010), of 1.5 MPa or more.

14. The tire according to claim 1, wherein each of the metal filaments has a tensile strength of 2,500 MPa or more.

15. The tire according to claim 1, wherein the straight metal filaments and the metal filaments that are shaped are arranged alternately.

16. A tire comprising:
a carcass as a skeleton extending toroidally between a pair of bead portions; and
a belt disposed on the outer side in the tire radial direction of a crown portion of the carcass, and including at least two belt layers;
characterized in that:
the belt layers are each composed of an elastomer-metal cord composite obtained by coating metal cords with an elastomer, each metal cord being composed of a bundle of a plurality of metal filaments arranged in a row without being twisted;
at least one pair of adjacent metal filaments in the metal cord differ in at least one of the amount of shaping and shaping pitch;
each of the belt layers has a thickness of more than 0.30 mm and less than 1.00 mm;
the distance in the tire radial direction between the metal cords in two adjacent layers of the belt layers is 0.10 mm or more and 1.20 mm or less at the center of the tire;
wherein at least one of the metal filaments in the metal cord is a straight metal filament; and
the straight metal filaments and the metal filaments that are shaped are arranged alternately.

* * * * *